United States Patent Office 2,742,449
Patented Apr. 17, 1956

2,742,449

PROCESS FOR IMPROVING THE HARDENING CHARACTERISTICS OF PHENOLIC RESINS

Felix Schlenker, Wiesbaden, Germany, assignor to Chemische Werke Albert, Wiesbaden-Kastel (Amoneburg), Germany No Drawing. Application October 31, 1952,
Serial No. 318,075

Claims priority, application Germany November 6, 1951

14 Claims. (Cl. 260—51)

This invention relates to processes for improving the hardening characteristics of hardenable resins produced by known condensation of phenols i. e. carbolic acid, cresols, xylenols, p,p'dioxydiphenylpropane and the like with formaldehyde and to the resulting resin compositions, and more particularly to phenolic resins containing, as hardening agents, organo-metallic or metal organic compounds having the metal joined in easily cleavable form, which are salts of polyvalent metals with carbonyl compounds of tautomeric reaction, which are capable of forming enolic or ketolic hydroxyl groups.

In a prior patent, a process is described for imparting hardening properties to phenolic resins involving mixing them with a reaction product obtained from metal-active compounds of trivalent metals or metals of higher valencies and carbonyl compounds of tautomeric reaction, which are capable of forming an enolic or ketolic OH group. Phenolic resins prepared with these hardening agents are highly active and lead to rapid gelatinization of the entire system. Premature hardening can be prevented by adding the hardening agent to the phenolic resin shortly before the phenolic resin is processed, but the high reactivity of the resin composition often renders the use of this procedure more or less tedious.

An object of the present invention is to provide phenolic resin compositions which are stable during storage, but which possess high activity during processing in the production of molded or cast products, films and coatings. Another object is to provide processes for hardening phenolic resins in which the temperature and duration of the period required for hardening are reduced.

Yet another object is to provide phenolic compositions or hardening processes for the same which require lesser quantities of other hardening agents such as hexamethylene tetramine.

In accordance with a preferred embodiment of the invention hardenable phenolic resins are mixed with a small quantity of an aluminum acetoacetic ester of a lower molecular alcohol, i. e. Al $(C_6H_9O_3)_3$. Other polyvalent metal organic derivatives of carbonyl compounds of tautomeric reaction containing the metal in easily cleavable form may be successfully used. Among the effective reagents are other compounds of acetoacetic ester with divalent metals or metals of higher valency, such as for example, cobalt acetoacetic ester of a lower alcohol Co $(C_6H_9O_3)_2$, nickel acetoacetic ester, Ni $(C_6H_9O_3)_2$; also corresponding metal compounds of acetyl acetone, formylacetophenone and other beta-ketones, and also of other compounds of tautomeric reaction such as malonic acid ester of the lower alcohols as the methyl, ethyl, propyl and butyl alcohols and others of low molecular weight.

The phenolic resin compositions of the present invention may be prepared merely by adding the metal organic compound, such as the aluminum acetoacetic ester to the intermediate phenolic resin in the state in which the latter is produced. Alternatively the addition may be made in a later phase of resin preparation, for example, after the resin has been diluted with a solvent as may be done in the production of lacquers, adhesives or the like. The addition also may be made after the resin has been converted to or incorporated in a plastic mass.

In accordance with an important embodiment, the metal organic hardening agent of the present invention is melted together with the hardenable phenolic resin at an elevated temperature as at 140–150° C. In accordance with yet another procedure, the acid hardening agent is first dissolved in a suitable solvent such as xylene and then added to the phenolic resin in dissolved or melted condition.

The amount of the hardening agent added to the phenolic resin depends upon the desired characteristics of the end products to be produced in each particular operation. Generally, however, the amount required is small and rarely exceeds 10% in relation to the amount of the phenolic resin. In practice, the amount to be used in any particular phenolic resin composition may be determined by test and the amount increased from a very small addition to that quantity imparting the desired hardening characteristics. In one series of phenolic resins, the addition of the metal compounds in adequate amount can cause gel formation and hardening at normal or slightly increased temperature.

*Example 1*

Eighty parts by weight of a 70% resol solution in alcohol are mixed with four parts by weight of aluminum acetoacetic ester and gently heated under reflux for a short period of time until a gel-like mass is obtained which can be easily shaped when warm. The resol solution is produced by condensation of 1 mol carbolic acid with 1.2 mol formaldehyde in the presence of 0.52 sodium hydroxide at a temperature of about 60° C. during four hours, dehydrating the reaction mass by distilling in vacuo and then adding ethyl alcohol to a concentration of 30% resin in alcoholic solution.

*Example 2*

One hundred parts by weight of a Novolak (produced by heating under reflux 108 parts of cresol with 76 parts of a 30% solution of formaldehyde in water for several hours, separating the produced resin from the aqueous layer and dehydrating the resin by heating to 150–160° C.) are melted and to the resulting molten mass seven parts by weight of aluminum acetoacetic ethyl ester are added at a temperature of 140–160° C. After the mass has cooled, an improved Novolak used under otherwise identical conditions, can be hardened with half of the amount of hexamethylene tetramine and can be utilized for the preparation of casting resins, phenolic molding resins and hardenable phenolic compositions of all kinds with or without the addition of fillers of varied character.

*Example 3*

Ninety parts by weight of a hardenable phenolic resin produced by condensation of 40 parts of p,p'dioxydiphenylpropane in alkali solution with 70 parts of 30% formaldehyde solution in water at normal temperature are melted and mixed at a temperature of 140° C. with eight parts by weight of the copper compound of formylacetophenone. The resulting phenolic resin composition can be used to advantage for the preparation of industrial adhesives which have to meet specific requirements with respect to heat stability; also for the manufacture of grinding wheels, discs, and the like. In these uses the conditions of hardening are considerably more moderate than when conventional phenolic compositions are employed.

Example 4

A plasticized phenolic resin is produced by combining 60 parts of cresol phenol-resol with 25 parts wood oil by heating the two components with 25 parts of butanol under reflux for 6 hours and distilling off the water by heating to 130–135° C. One hundred parts by weight of a solution containing 75% of this plasticized phenolic resin in butanol xylene (1:1) are mixed with fifty parts by weight of xylene containing dissolved therein seven parts by weight of nickel acetylacetone. After adjustment of the resulting binding material to the desired concentration, films are produced by baking a ground coat at 130° C. for fifteen minutes and a covering layer at 150° C. for thirty minutes. The film obtained is highly elastic and its resistance to chemicals, solvents and motor fuels is at least equal to the resistance obtainable when this same phenolic resin without the addition of the hardening agent is applied and prepared by baking a ground coat at 170° C. for fifteen minutes and a covering layer at 190° C. for thirty minutes.

Example 5

A resol produced by condensation at nearly normal temperature and in alkali solution of 24 parts of p,p'dioxydiphenylpropane with 50 parts 30% formaldehyde solution in water is heated under reflux with 24 parts of castor oil for 6 hours. After heating, water is distilled off and the resin slowly heated to 130–135° C. Two hundred parts by weight of a solution containing 75% of this plasticized phenolic resin are mixed with one hundred parts by weight of a xylene solution containing nine parts by weight of aluminum aceto-acetic ethyl ester previously dissolved therein. The resin solution thus prepared is completely stable in storage and yields after adjustment to the desired concentration of the binding material, good quality films by baking a ground coat at 130° C. for fifteen minutes and a covering layer at 150° C. for thirty minutes. The quality of such films is comparable with that obtained using this same phenolic resin without the addition of the hardening agent, after baking a ground coat at 170° C. for fifteen minutes and a covering layer at 190° C. for thirty minutes.

Example 6

The resin described in Example 5 is prepared utilizing the same proportions and the same procedure as Example 4 with the exception that the hardening agent employed is the aluminum compound of malonic ethyl ester. The quality of the baked films is improved to substantially the same extent as the films described in said prior example.

Example 7

The procedure of Example 4 is followed except that the hardening agent employed is the copper compound of acetyl acetone. The quality of the films obtained with this hardening agent is improved in the same manner as the films described in Examples 4 and 5.

The hardening process and phenolic resin compositions of the present invention lead to and possess several outstanding advantages.

By the addition of the novel hardening agents the temperature and duration of hardening of the phenolic resins are reduced or if hexamethylene tetramine or the like is used, the amount required is reduced.

The activity of the hardening agents employed in accordance with the present invention exceeds by far the activity of hardening agents used in prior processes.

Novolak compositions containing the novel hardening agents can be easily converted into resin compositions capable of quick transformation into the insoluble condition. Such resin compositions, furthermore, require or can be made to utilize a smaller amount of a conventional hardening agent than ordinary phenolic resin compositions. These qualities are of particular importance in the perparation of phenolic molding resins and resin compositions.

As illustrated in the examples, phenolic baking resins hardened at higher temperatures can be substantially improved. The baking conditions of conventional plasticized phenolic resins which are soluble in benzene hydrocarbons as well as the normal alcohol soluble and hardenable resols can be considerably moderated or lowered and the resistance of the resulting films to chemicals and motor fuels can be considerably increased through utilization of the hardening agent of the process and compositions of the present invention. The baking temperature of plasticized phenolic resins can be easily reduced by 40° C. using an equal baking period, and still satisfactory resistance of the film is obtained.

In comparision with the hardening agents employed in the hereinbefore described prior process which were obtained from metal-active compounds of polyvalent metals and carbonyl compounds of tautomeric reaction, the advantages of using the metal organic compounds of the present invention include (1) the provision of phenolic resins as well as solutions of the same which possess superior stability in storage and also (2) the capacity for making possible the preparation of highly concentrated solutions of improved properties.

It should be understood that the present invention is not limited to the specific details hereinbefore set out, but that it extends to all equivalent materials, procedures and conditions which will occur to those skilled in the art upon consideration of the terms and scope of the claims hereinafter set forth.

I claim:

1. A process for improving the hardening characteristics of hardenable resins produced by condensation of a phenol with formaldehyde, which comprises incorporating in the phenol resin to be hardened a metal organic compound, the same being a salt of a polyvalent metal with a tautomeric-reacting carbonyl compound of the keto-enol structure having the formula $$R_1—CO—CH_2—CO—R_2$$

wherein $R_1$ is selected from the group consisting of hydrogen, alkyl, aryl and alkoxy radicals and $R_2$ is selected from the group consisting of alkyl, aryl and alkoxy radicals.

2. A process for improving the hardening characteristics of phenolic resins produced by condensation of a phenol with formaldehyde which comprises incorporating in the phenol resin to be hardened a metal organic compound, the same being a salt of a polyvalent metal with acetoacetic ester of a lower alcohol.

3. A process for improving the hardening characteristics of phenolic resins produced by condensation of a phenol with formaldehyde which comprises incorporating in the phenol resin to be hardened a metal organic compound, the same being a salt of a polyvalent metal with a beta-diketone.

4. A process for improving the hardening characteristic of phenolic resins produced by condensation of a phenol with formaldehyde which comprises incorporating in the phenol resin to be hardened a metal organic compound, the same being a salt of a polyvalent metal with a malonic acid ester of a lower alcohol.

5. A hardenable resin produced by the condensation of a phenol with formaldehyde, containing as a hardening agent a metal organic compound, the same being a salt of a polyvalent metal with a tautomeric-reacting carbonyl compound of the keto-enol structure having the formula $R_1—CO—CH_2—CO—R_2$ wherein $R_1$ is selected from the group consisting of hydrogen, alkyl, aryl and alkoxy radicals and $R_2$ is selected from the group consisting of alkyl, aryl and alkoxy radicals.

6. A hardenable resin produced by the condensaiton of a phenol with formaldehyde containing as a hardening agent a metal organic compound, the same being a salt of a polyvalent metal with acetoacetic ester of a lower alcohol.

7. A hardenable resin produced by the condensation of a phenol with formaldehyde containing as a hardening agent a metal organic compound, the same being a salt of a polyvalent metal with acetylacetone.

8. A hardenable resin produced by the condensation of a phenol with formaldehyde containing as a hardening agent a metal organic compound, the same being a salt of a polyvalent metal with malonic acid ester of a lower alcohol.

9. A hardenable resin produced by the condensation of a phenol with formaldehyde containing as a hardening agent a metal organic compound, the same being salt of a trivalent metal with a tautomeric-reacting carbonyl compound of the keto-enol structure having the formula $R_1$—CO—$CH_2$—CO—$R_2$ wherein $R_1$ is selected from the group consisting of hydrogen, alkyl, aryl an dalkoxy radicals and $R_2$ is selected from the group consisting of alkyl, aryl and alkoxy radicals.

10. A hardenable resin produced by the condensation of a phenol with formaldehyde containing as a hardening agent a metal organic compound defined as an aluminum acetoacetic ester of a lower alcohol.

11. A hardenable resin solution, stable in storage, containing a resin produced by the condensation of a phenol with formaldehyde, containing as a hardening agent a metal organic compound, the same being salt of a polyvalent metal with a tautomeric-reacting carbonyl compound of the keto-enol structure having the formula $R_1$—CO—$CH_2$—CO—$R_2$ wherein $R_1$ is selected from the group consisting of hydrogen, alkyl, aryl and alkoxy radicals and $R_2$ is selected from the group consisting of alkyl, aryl and alkoxy radicals.

12. A hardenable resin solution, stable in storage, containing a resin produced by the condensation of a phenol with formaldeayhde, containing as a hardening agent a metal organic compond, the same being a compound of a polyvalent metal with acetoacetic ester of a lower alcohol.

13. A Novolak produced by the condensation of a phenol with formaldehyde containing as a hardening agent a metal organic compound, the same being salt of a polyvalent metal with a tautomeric-reacting carbonyl compound of the keto-enol structure having the formula $R_1$—CO—$CH_2$—CO—$R_2$ wherein $R_1$ is selected from the group consisting of hydrogen, alkyl, aryl and alkoxy radicals and $R_2$ is selected from the group consisting of alkyl, aryl and alkoxy radicals.

14. A Novolak produced by the condensation of a phenol with formaldehyde containing as a hardening agent an aluminum acetoacetic ester of a lower alcohol.

References Cited in the file of this patent

FOREIGN PATENTS 657,551    Great Britain _____ Sept. 19, 1951